United States Patent
Misaki

[19]

[11] Patent Number: 6,121,550
[45] Date of Patent: Sep. 19, 2000

[54] CABLE JOINT STRUCTURE

[75] Inventor: Yoshio Misaki, Nagoya, Japan

[73] Assignee: Chuo Hatsujo Kabushiki Kaisha, Aichi-Ken, Japan

[21] Appl. No.: 09/140,755

[22] Filed: Aug. 25, 1998

[30] Foreign Application Priority Data

Aug. 26, 1997 [JP] Japan ................................. 9-229267

[51] Int. Cl.⁷ .................................................. H01R 4/00
[52] U.S. Cl. ........................... 174/86; 174/88 R; 174/92; 439/8
[58] Field of Search ............................. 174/92, 86, 88 R, 174/135, 84 R, 85, 94 R, 94 S; 439/8, 6

[56] References Cited

U.S. PATENT DOCUMENTS

| | | | |
|---|---|---|---|
| 3,278,674 | 10/1966 | Matthysse et al. | 174/138 |
| 3,325,591 | 6/1967 | Wahl | 174/138 |
| 4,316,646 | 2/1982 | Siebens | 339/7 |
| 4,778,948 | 10/1988 | Fitch et al. | 174/88 R |
| 5,594,213 | 1/1997 | Skopic | 174/91 |
| 5,798,486 | 8/1998 | Eisinger et al. | 174/92 |
| 5,824,961 | 10/1998 | Burek et al. | 174/135 |

*Primary Examiner*—Dean A. Reichard
*Assistant Examiner*—William H. Mayo, III
*Attorney, Agent, or Firm*—Sughrue, Mion, Zinn, Macpeak & Seas, PLLC

[57] ABSTRACT

In a cable joint structure, a first casing has a first rail member. A first end portion has a lug portion directed opposite to the first rail, and connected to one end of a first cable so that the first end portion moves along the first rail member. A second casing has a second rail member. A second end portion has a recess portion into which the lug portion interfits, and connected to one end of a second cable so that the second end portion moves along the second rail member. A rotation lock member has a groove provided on the first casing and a protrusion provided on the second casing to interfit the protrusion into the groove so as to unite the first casing and the second casing. An engagement member has an elastic engagement tip provided on the first casing and an engagement opening provided on the second casing to interfit the engagement tip into the engagement opening so as to detachably unite the first casing and the second casing.

12 Claims, 3 Drawing Sheets

CABLE JOINT STRUCTURE

BACKGROUND OF THE INVENTION

1. Field of the Invention

The invention relates to a cable joint structure used to detachably connect two cables.

2. Description of Prior Art

In a cable joint structure of FIG. 5, there has been provided a rectangular casing (J1) in which a first casing cap (J4) is disposed to attach a first outer casing (J3) of a first cable (J2) to one side of the casing (J1). To one end of the first cable (J2), a first end portion (J6) is connected in the manner to slide within the casing (J1). The first end portion (J6) has a key-shaped hole (J5). A second casing cap (J9) is provided to attach a second outer casing (J8) of a second cable (J7) to the other side of the casing (J1). To one end of the second cable (J7), a spherical portion (J10) is connected as a second end portion which interfits into the key-shaped hole (J5). A lid cap (J11) is provided to shield an open ended area of the casing (J1).

Upon connecting the first cable (J2) to the second cable (J7), the spherical portion (J10) of the second cable (J7) is brought into the key-shaped hole (J5) of the first end portion (J6), and then the second casing cap (J9) is attached to the casing (J1). Finally, the lid cap (J11) is clamped on the casing (J1) to secure the connected portions against removal.

This, however, requires the three-step procedures to result in complicated and time-consuming operation. For this reason, it is difficult to handle the cable joint structure particularly for those who are not accustomed to operating the cable joint structure.

Therefore, the present invention has made with the above drawbacks in mind, it is a main object of the invention to provide a cable joint structure in which is capable of quickly connecting and disconnecting with ease, and making it ready to handle even for those who are unaccustomed to operating the cable joint structure.

SUMMARY OF THE INVENTION

According to the present invention, when connecting a first cable to a second cable which are in turn placed on a first casing and a second casing, a protrusion of a rotation lock member is brought into the groove with a first rail member located to face a second rail member. Then, an engagement member interfits its tip into an engagement opening to unite the first casing and the second casing to connect the two cables together.

In this situation, it is possible to place the first and second casings in position by interfitting the protrusion into the groove. It is also possible to unite the first and second casings together by locating the first rail member to face the second rail member so as to interfit the engagement tip into the engagement opening.

Upon disconnecting the first cable from the second cable, releasing the engagement member dislodges the lug portion from the recess so as to make the first cable disconnect from the second cable. In this way, with the use of the rotation lock member and the engagement member, it is possible to readily connect and disconnect the cables so as to make a cable joint structure easy to handle.

With the lug portion tapered off progressively as away from a basal portion thereof, it is easy to introduce the lug portion to the recess portion upon interfitting the lug portion into the recess portion when bringing the protrusion into the groove with the first rail member located to face the second rail member.

With the first cable rotationally connected to the first end portion so that the former can swivel against the latter, it is possible for the first end portion to orient freely irrespective of the torsional direction which the first cable is oriented. This obviates the torsion between the first casing and the first end portion so as to substantially eliminate the torsional friction therebetween.

With the second cable rotationally connected to the second end portion so that the former can swivel against the latter, it is possible for the second end portion to orient freely irrespective of the torsional direction which the second cable is oriented. This obviates the torsion between the second casing and the second end portion so as to substantially eliminate the torsional friction therebetween.

Due to the elimination of the torsional friction of the first and second casings between the first and second end portions respectively, it is possible to manipulate the connected cables smoothly with the least burden.

With the first and second end portions each embraced by the first and second rail members, it is possible to retain the first and second end portions in position even when the first and second rail members turn respectively downward. This eliminates the necessity of holding the end portions by one hand, thus making it possible to respectively connect and disconnect the cables with a single hand operation.

With the inner wall of the recess portion tapered in such a manner as to progressively increase its diametrical dimension as moving outward, it is easy to invariably introduce the lug portion to the recess portion upon interfitting the lug portion into the recess portion.

BRIEF DESCRIPTION OF THE DRAWINGS

A preferred form of the present invention is illustrated in the accompanying drawings in which.

DETAILED DESCRIPTION OF THE PREFERRED EMBODIMENTS OF THE INVENTION

Referring to FIGS. 1 through 4 which show a cable joint structure used to connect and disconnect cables when carrying out a teleoperation. The cable joint structure detachably connects two first cables 1 and corresponding two second cables 2, and having a first joint unit (A) and a second joint unit (B). The first joint unit (A) is provided to guide the first cables 1 therealong, and the second joint unit (B) is provided to guide the second cables 2 therealong.

The first joint unit (A) has a first casing (A2) in which two first rail members (A1) are provided in the lengthwise direction. Within the first casing (A2), two first end portions (A4) are provided to slidably move along the respective first rail members (A1). Each of the first end portions (A4) has a lug portion (A3) protracted upward therefrom, and is connected to one end of the first cable 1.

Figure 3:
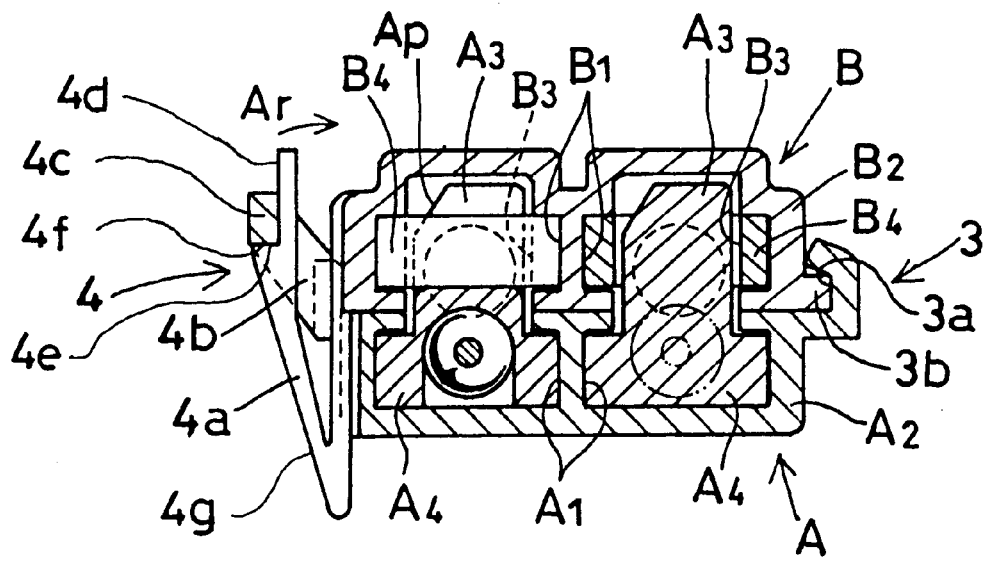
FIG. 3 is a latitudinal cross sectional view of the cable joint structure taken along the line III—III of FIG. 1.
Figure 4:
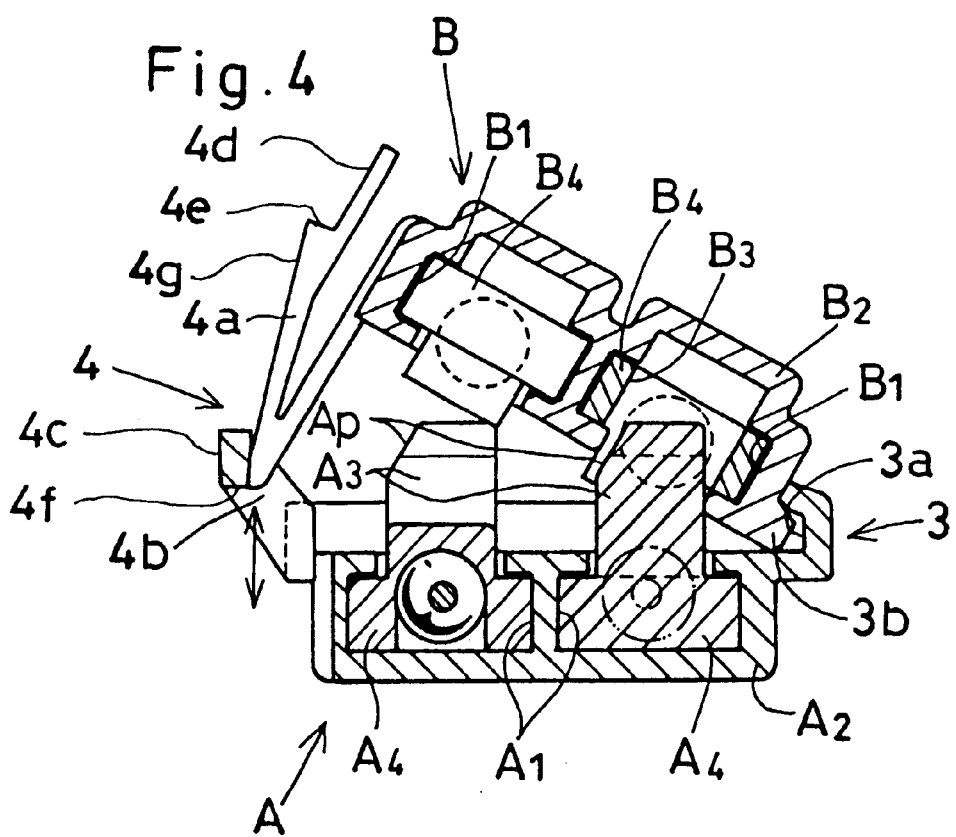
FIG. 4 is a latitudinal cross sectional view of the cable joint structure when an engagement member is unlocked.
Figure 5:
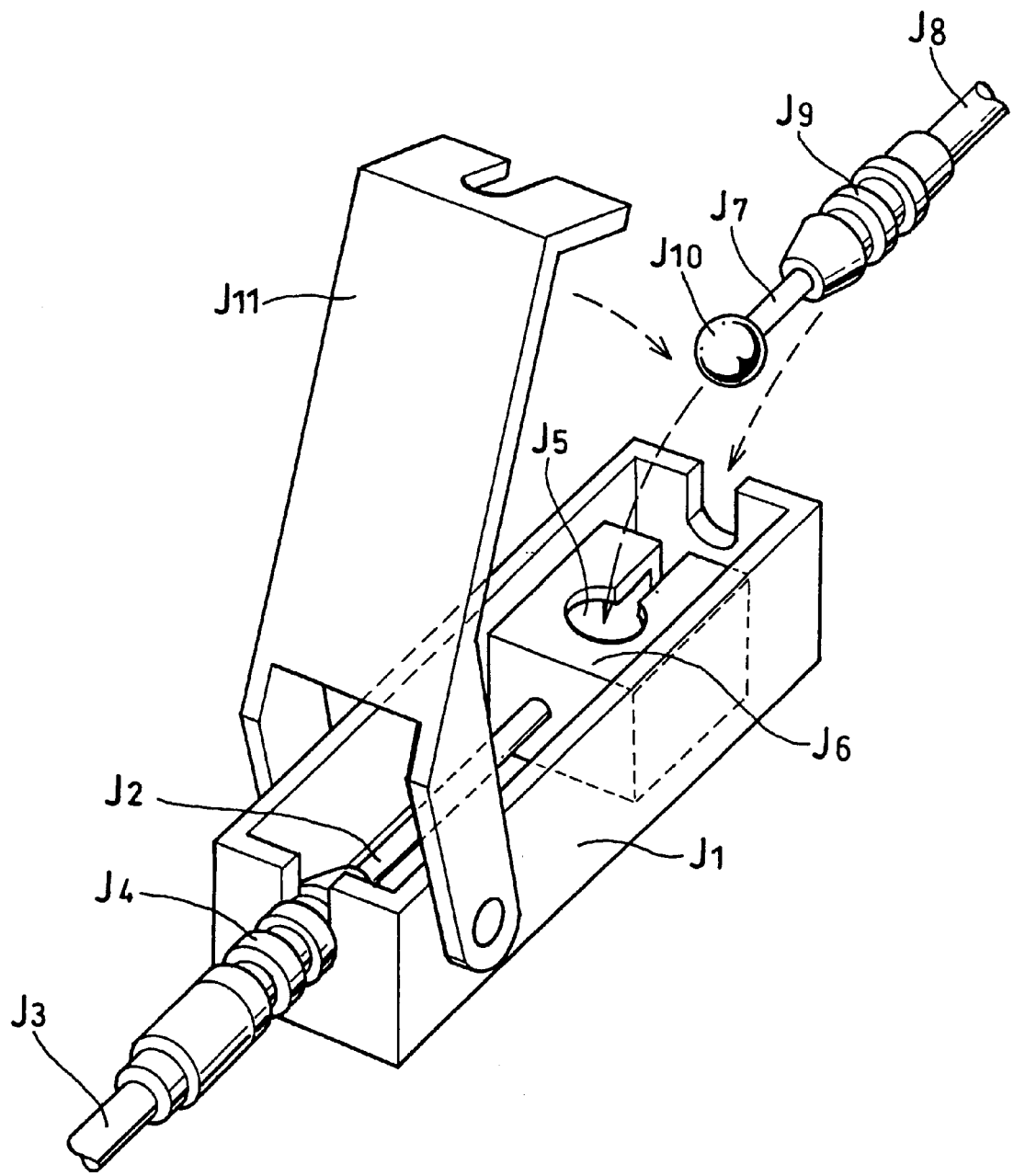
FIG. 5 is an exploded perspective view of a prior cable joint structure.

As shown in FIGS. 3 and 4, the first rail member (A1) has such a cross section as to embrace the first end portion (A4) so as to retain the first end portion (A4) within the first rail member (A1) irrespective of which position the first casing (A2) occupies.

One end of the first cable 1 has a spherical ball (A5) which is pivotably enclosed within the first end portion (A4) in order to make the first cable 1 swivel around its center. Conversely, it makes possible to swivel the first end portion (A4) about both the spherical ball (A5) and the first cable 1, thus resultantly making the first cable 1 swivel against the first end portion (A4).

With the first cable 1 rotationally connected to the first end portion (A4) so that the former can swivel against the latter, it is possible for the first end portion (A4) to orient freely irrespective of the torsional direction which the first cable 1 is oriented. This obviates the torsion between the first casing (A2) and the first end portion (A4) so as to substantially eliminate the torsional friction therebetween.

The second joint unit (B) has a second casing (B2) in which two second rail members (B1) are provided in the lengthwise direction. Within each of the second casings (B2), a second end portion (B4) is provided to slidably move along the second rail member (B1). The second end portion (B4) has a recess portion (B3) into which the lug portion (A3) is to be interfit from outside the second rail member (B1), and is connected to one end of the second cable 2.

Figure 1:
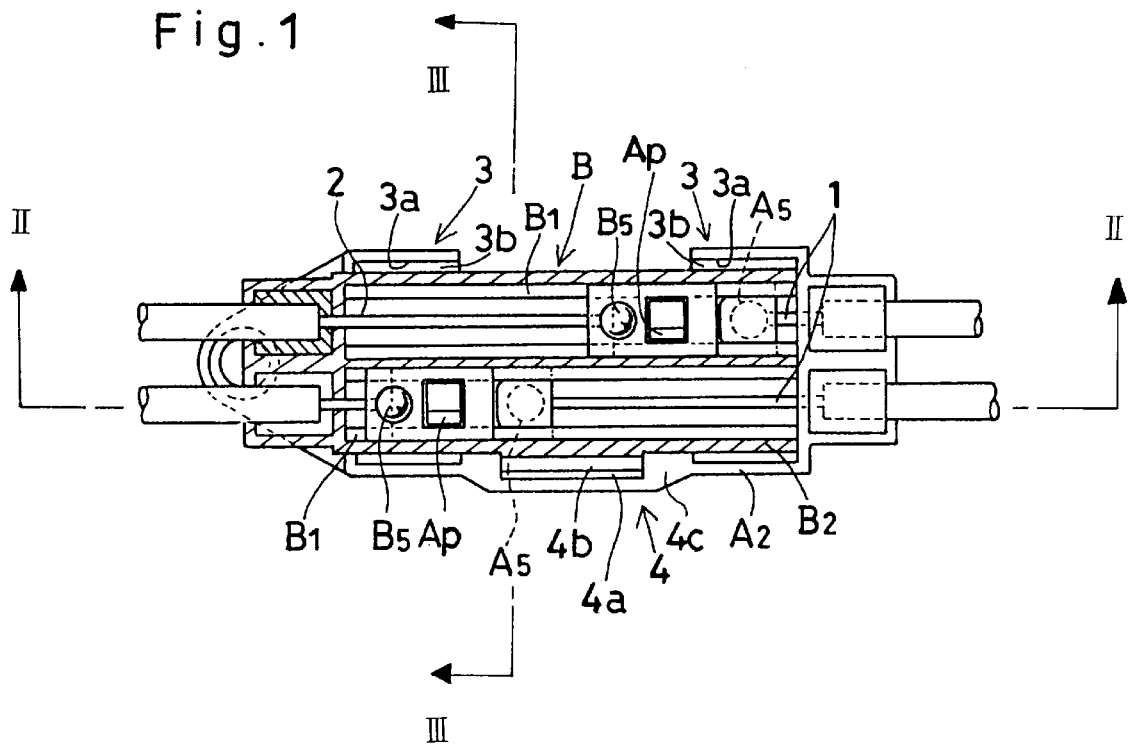
FIG. 1 is a longitudinal cross sectional view of a cable joint structure when first and second casings are united according to an embodiment of the invention.
Figure 2:
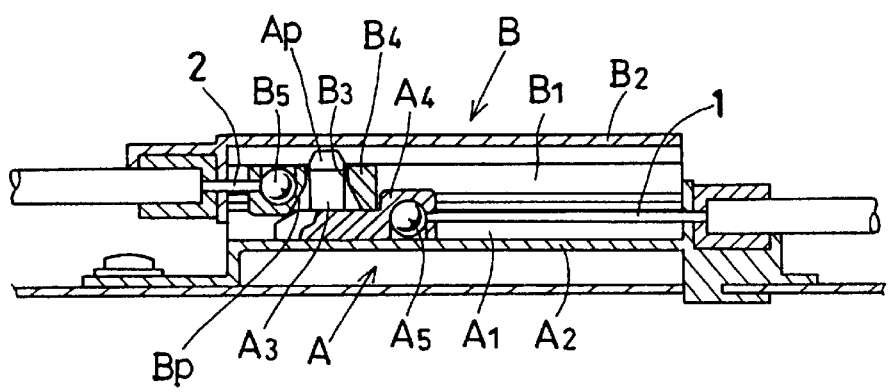
FIG. 2 is a longitudinal cross sectional view of the cable joint structure taken along the line II—II of FIG. 1.

As evidently shown in FIG. 2, the second rail member (B1) has such a cross section as to embrace the second end portion (B4) so as to retain the second end portion (B4) within the second rail member (B1) irrespective of which position the second casing (B2) occupies.

One end of the second cable 2 has a spherical ball (B5) which is pivotably enclosed within the second end portion (B4) in order to make the second cable 2 swivel around its center. Conversely, it makes possible to swivel the second end portion (B4) about both the spherical ball (B5) and the second cable 2, thus resultantly making the second cable 2 swivel against the second end portion (B4).

With the second cable 2 rotationally connected to the second end portion (B4) so that the former can swivel against the latter, it is possible for the second end portion (B4) to orient freely irrespective of the torsional direction which the second cable 2 is oriented. This obviates the unfavorable torsion between the second casing (B2) and the second end portion (B4) so as to substantially eliminate the torsional friction therebetween.

Upon uniting the first casing (A2) and the second casing (B2) together, the first casing (A2) is pivoted against the second casing (B2) at a rotation lock member 3 to place the first rail member (A1) and the second rail member (B1) to face each other so as to interfit the lug portion (A3) into the recess portion (B3). Thus, the first casing (A2) and the second casing (B2) are locked by an engagement member 4 to secure the first casing (A2) against the removal.

The rotation lock member 3 has a groove 3a provided by curling one open ended side of the first casing (A2), and having a protrusion 3b provided on one open ended side of the second casing (B2). The protrusion 3b is brought into the groove 3a to pivot the first casing (A2) against the second casing (B2) with the rotation lock member 3 at a central axis.

The engagement member 4 has a triangular elastic engagement tip 4a provided on the other open ended side of the second casing (B2), and having a frame 4c provided on the other open ended side of the first casing (A2). The engagement tip 4a is brought into the engagement opening 4b surrounded by the frame 4c to lock the first casing (A2) against the second casing (B2) when uniting the first casing (A2) with the second casing (B2).

By pushing a triangular end 4d of the engagement tip 4a in the direction of arrow (Ar) in FIG. 3, it is possible to dislodge a stepped portion 4e of the tip 4a from an underside 4f of the frame 4c so as to unlock the first casing (A2) from the second casing (B2). During the process in which the engagement tip 4a is released from the frame 4c, an expandable half 4g of the engagement tip 4a slides on an inner side of the frame 4c to pivotably move the second casing (B2) upward around the rotation lock member 3 with an assist of the elastic force of the engagement tip 4a as shown in FIG. 4.

In this instance, the lug portion (A3) has a tapered-off portion (Ap) which progressively decreases its diametrical dimension as away from a basal portion thereof toward a top end of the lug portion (A3). This makes it easy to introduce the lug portion (A3) toward the recess portion (B3) upon interfitting the lug portion (A3) into the recess portion (B3) when bringing the protrusion 3b into the groove 3a with the first rail member (A1) located to face the second rail member (B1).

On the other hand, an inner wall which defines the recess portion (B3) is funnel-shaped to form a tapered portion (Bp), a diameter of which progressively increases as approaching downward as shown in FIG. 2. Under the presence of the tapered portion (Bp), it is easy to introduce the lug portion (A3) toward the recess portion (B3) upon interfitting the lug portion (A3) into the recess portion (B3) when locating the second casing (B2) in position to face the first casing (A2).

With the structure thus far described, the first casing (A2) is brought to the second casing (B2) to insert the protrusion 3b to the groove 3a with the first rail member (A1) located to face the second rail member (B1). Then, the engagement tip 4a is forced into the engagement opening 4b of the frame 4c so as to interfit the lug portion (A3) into the recess portion (B3) of the second end portion (B4), thus uniting the first casing (A2) and the second casing (B2) together. This makes it possible to unite the first casing (A2) and the second casing (B2) together to positively connect the first cable 1 to the second cable 2 with two-step operation.

Upon disconnecting the first cable 1 from the second cable 2, the triangular end 4d of the engagement tip 4a is pushed in the direction of arrow (Ar) in FIG. 3, thus unlocking the engagement member 4 to pivot the first casing (A2) upward around the rotation lock member 3 so as release the lug portion (A3) from the recess portion (B3). This makes it possible to disunite the first casing (A2) and the second casing (B2) with a single step operation.

Advantages of the Invention (i) With the two-step operation necessary to connect the first cable 1 to the second cable 2 as opposed the prior art in which the three-step operation has been demanded, it is possible to readily complete the wire connecting procedures even for those who are unaccustomed to the cable joint operation.

(ii) Due to the first end portion (B4) and the second end portions (A4) each retained by the first rail members (A1) and the second rail member (B1), it is possible to connect and disconnect the corresponding cables 1, 2 with a single hand operation because there is no necessity to purposely hold the first end portion (B4) and the second end portions (A4) in place during the operation.

(iii) Because of no torsional force induced between the casing (A2, B2) and the end portion (A4, B4), there is no possibility to appear the torsional friction therebetween. This makes it possible to manipulate the respective cables 1, 2 smoothly with the least burden.

Modification Form

It is to be observed that the present cable joint structure can be used to connect and disconnect one or two more paired cables instead of only two paired cables 1, 2.

While there has been described what is at present thought to be preferred embodiments of the invention, it will be understood that modifications may be made therein and it is intended to cover in the appended claims all such modifications which fall within the spirit and scope of the invention.

What is claimed is:

1. A cable joint structure comprising:
   (a) a first casing having a first rail member;
   (b) a first end portion having a lug portion directed opposite to said first rail, member and connected to one end of a first cable so that said first end portion moves along said first rail member;
   (c) a second casing having a second rail member;
   (d) a second end portion having a recess portion into which said lug portion is to interfit from a direction opposite to said second rail member, and connected to one end of a second cable so that said second end portion moves along said second rail member;
   (e) a rotation lock member including a groove provided on one side of said first casing and a protrusion provided on one side of said second casing so that said protrusion is interfit into said groove so as to lock said first casing and said second casing with said first rail member located to face said second rail member;
   (f) an engagement member including an elastic engagement tip provided on the other side of said first casing and an engagement opening provided on the other side of said second casing so that said engagement tip is interfit into said engagement opening so as to detachably unite said first casing and said second casing which are locked by said rotation lock member;
   (g) an outer surface of said lug portion of said first end portion having a tapered-off portion which progressively decreases its diametrical dimension as away from a basal portion thereof;
   (h) said first cable being rotationally connected to said first end portion provided on said first rail member, and an outer casing of said first cable being rotationally connected to said first casing, said second cable being rotationally connected to said second end portion provided on said second rail member, and an outer casing of said second cable being rotationally connected to said second casing; and
   (i) said first cable being pivotably connected to said first end portion by way of a spherical ball, and said second cable being pivotably connected to said second end portion by way of a spherical ball.

2. A cable joint structure as recited in claim 1, wherein said first rail member has such a cross section as to embrace said first end portion, and said second rail member has such a cross section as to embrace said second end portion.

3. A cable joint structure as recited in claim 1, wherein an inner wall of said recess portion has a tapered portion, a diametrical dimension of which progressively increases outwardly.

4. A cable joint structure as recited in claim 1, wherein an inner wall which defines said recess portion is funnel-shaped to form a tapered portion, a diameter of which progressively increases as approaching downward.

5. A cable joint structure as recited in claim 1, wherein said engagement member has a triangular elastic engagement tip provided on one open ended side of said first casing, and having a frame provided on one open ended side of said second casing, and said engagement tip is brought into said engagement opening to lock said first casing against said second casing when uniting said first casing with said second casing to connect said first cable to said second cable.

6. A cable joint structure as recited in claim 1, wherein said rotation lock member has a groove provided by curling one open ended side of said first casing, and having a protrusion provided on one open ended side of said second casing, and said protrusion is brought into said groove to pivot said first casing against said second casing with said rotation lock member at a central axis.

7. A cable joint structure comprising:
   (a) a first casing having a first rail member;
   (b) a first end portion having a lug portion directed opposite to said first rail, member and connected to one end of a first cable so that said first end portion moves along said first rail member;
   (c) a second casing having a second rail member;
   (d) a second end portion having a recess portion into which said lug portion is to interfit from a direction opposite to said second rail member, and connected to one end of a second cable so that said second end portion moves along said second rail member;
   (e) a rotation lock member including a groove provided on one side of said first casing and a protrusion provided on one side of said second casing so that said protrusion is interfit into said groove so as to lock said first casing and said second casing with said first rail member located to face said second rail member;
   (f) an engagement member including an elastic engagement tip provided on the other side of said first casing and an engagement opening provided on the other side of said second casing so that, said engagement tip is interfit into said engagement opening so as to detachably unite said first casings and said second casing which are locked by said rotation lock member;
   (g) said first cable being rotationally connected to said first end portion provided on said first rail member, and an outer casing of said first cable being rotationally connected to said first casing, said second cable being rotationally connected to said second end portion provided on said second rail member, and an outer casing of said second cable being rotationally connected to said second casing; and
   (h) said first cable being pivotably connected to said first end Portion by way of a spherical ball, and said second cable being pivotably connected to said second end portion by way of a spherical ball.

8. A cable joint structure as recited in claim 7, wherein said first rail member has such a cross section as to embrace said first end portion, and said second rail member has such a cross section as to embrace said second end portion.

9. A cable joint structure as recited in claim 7, wherein an inner wall of said recess portion has a tapered portion, a diametrical dimension of which progressively increases outwardly.

10. A cable joint structure as recited in claim 7, wherein an inner wall which defines said recess portion is funnel-shaped to form a tapered portion, a diameter of which progressively increases as approaching downward.

11. A cable joint structure as recited in claim 7, wherein said engagement member has a triangular elastic engagement tip provided on one open ended side of said first casing, and having a frame provided on one open ended side of said second casing, and said engagement tip is brought into said engagement opening to lock said first casing against said second casing when uniting said first casing with said second casing to connect said first cable to said second cable.

12. A cable joint structure as recited in claim 7, wherein said rotation lock member has a groove provided by curling one open ended side of said first casing, and having a protrusion provided on one open ended side of said second casing, and said protrusion is brought into said groove to pivot said first casing against said second casing with said rotation lock member at a central axis.

* * * * *